(12) United States Patent
Cohen

(10) Patent No.: US 6,663,931 B2
(45) Date of Patent: Dec. 16, 2003

(54) WHITE OIL EXTRUSION LUBRICANT

(75) Inventor: Stephen Cedric Cohen, Chestnut Ridge, NY (US)

(73) Assignee: Crompton Corporation & Petro-Canada, Middlebury (CA)

( * ) Notice: Subject to any disclaimer, the term of this patent is extended or adjusted under 35 U.S.C. 154(b) by 6 days.

(21) Appl. No.: 09/876,659

(22) Filed: Jun. 7, 2001

(65) Prior Publication Data

US 2002/0034599 A1 Mar. 21, 2002

Related U.S. Application Data

(63) Continuation of application No. 09/627,557, filed on Jul. 28, 2000, now abandoned.

(51) Int. Cl.[7] .............................................. C08L 27/06
(52) U.S. Cl. ..................................... 428/36.9; 524/491
(58) Field of Search ....................... 524/491; 428/35.7, 428/36.9, 36.92

(56) References Cited

U.S. PATENT DOCUMENTS

| | | | | |
|---|---|---|---|---|
| 3,666,700 A | * | 5/1972 | King et al. ............. | 260/28.5 D |
| 3,666,735 A | | 5/1972 | Rosis | |
| 3,725,311 A | | 4/1973 | Grubb ........................ | 252/522 |
| 3,775,359 A | | 11/1973 | Georgiana et al. ..... | 260/23.7 R |
| 3,830,888 A | | 8/1974 | King | |
| 3,975,326 A | * | 8/1976 | de Vrieze ................. | 260/23 H |
| 4,015,064 A | | 3/1977 | Feldman et al. ............. | 528/491 |
| 4,058,495 A | | 11/1977 | Serratore et al. .......... | 260/17 A |
| 4,239,679 A | | 12/1980 | Rolls et al. | |
| 4,544,694 A | | 10/1985 | Bower | |
| 5,210,140 A | * | 5/1993 | Greenlee et al. ............. | 525/205 |
| 5,442,012 A | | 8/1995 | Kempner et al. | |
| 5,453,176 A | * | 9/1995 | Narloch et al. ................ | 208/58 |
| 6,136,181 A | * | 10/2000 | Ziemer ........................ | 208/144 |

FOREIGN PATENT DOCUMENTS

| | | |
|---|---|---|
| EP | 0 277 831 A2 | 8/1988 |
| EP | 0 403 056 A2 | 12/1990 |
| EP | 0 684 971 | 12/1995 |
| GB | 1083841 | 9/1967 |
| GB | 1 265 298 | 3/1972 |
| JP | 53136851 | 11/1978 |
| WO | WO 93/07208 | 4/1993 |
| WO | WO 00/42095 | 7/2000 |

OTHER PUBLICATIONS

Duvis T. et al., "Plasticized PVC Films/Petroleum Oils: The Effect of Ultraviolet Irradiation on Plasticizer Migration", *Journal of Applied Polymer Science*, 42(1):191–198 (1991), XP–001024702.

G.M. Andrus, *Plastic Packaging*, Natl. Tech. Conf., Soc. Plastic Eng., pp. 69–75 (1969).

P.J. Davis et al., Soc. Plast. Eng., Tech. Pap. 19, pp. 477–479 (1973).

J.E. Hartitz, *Pol. Eng. Sci.*, vol. 14, No. 5 (May, 1974), pp. 392–398.

Kirk–Othmer, *Encyl. of Chem. Tech.*, 4th Ed, vol. 19, pp. 258–278 (1996).

* cited by examiner

*Primary Examiner*—Sandra M. Nolan
(74) *Attorney, Agent, or Firm*—Michael P. Dilworth

(57) ABSTRACT

The invention pertains to the use of a white oil having a select viscosity as an extrusion lubricant for PVC, including PVC potable water pipe.

25 Claims, 2 Drawing Sheets

WHITE OIL EXTRUSION LUBRICANT

This is a continuation of application Ser. No. 09/627,557, filed Jul. 28, 2000, now abandoned.

BACKGROUND OF THE INVENTION

1. Field of the Invention

The invention pertains to the use of white oil having a select viscosity as an extrusion lubricant for vinyl polymers, especially polyvinyl chloride (PVC). In practice, the invention is directed to an extrusion process that has improved external lubrication thus lowering power requirements and processing costs; and to a PVC composition having improved tensile and modulus strength, important in certain applications such as, for example, PVC potable water piping, to which end use the invention is especially suited.

2. Description of the Prior Art

The commercial importance of polyvinyl chloride is due in large measure to its adaptability to a broad spectrum of different use settings. It can be heavily plasticized and thereby made soft and flexible; or it can be left unplasticized for applications requiring a rigid material. Rigid PVC in this regard is widely employed as a material of construction for siding, window profiles, fences, doors and, importantly, pipes, including pressurized pipes. In addition to having adequate rigidity to resist bursting, and conversely to permit such pipes to be buried without fear of their being crushed by overburden, the PVC base resin itself is also sufficiently inert to allow such pipes to carry potable water.

One of the difficulties attendant rigid PVC piping, however, is in the making of same: PVC base resin is recognized to be brittle, hard and very difficult to process. For pipe fabrication, extrusion is conventionally used. But the high temperatures typically needed to extrude PVC can cause premature fusing of the material; and operation at lower temperatures are uneconomical inasmuch as the higher shear rates required translate into commensurately higher power costs.

Remediation of this problem has generally focused on the addition of lubricants, often compounded into the PVC resin, which ameliorate rheological behavior. The use of lubricants, however, must be done with deliberation: they can not adversely affect the mechanical integrity of the pipe, nor alter the final chemical quality of same thus rendering it unuseable for certain applications. For example, certain lubricants leach, which, if toxic or malodorous, would render them unsuitable for potable water piping. Indeed, products used in drinking water installations, including rigid PVC piping, is subject to various criteria promulgated by the National Sanitation Foundation.

Conventionally, lubricants are divided into two separate classes: internal lubricants and external lubricants. Internal lubricants, typically comprised of metal stearates such as calcium stearate, operate by improving inter-particulate flow when PVC is in molten form. They typically have high compatibility with PVC and are often polar.

Much more directly concerned with the extrusion process, however, are the external lubricants: these are used to reduce the tendency of the PVC to stick to the metal surfaces of the processing equipment, and to delay the fusion of the PVC powder into a melt. External lubricants typically have low compatibility with PVC and are usually non-polar. Unlike internal lubricants, external lubricants eventually migrate to the melt surface of the PVC hence providing lubrication between the polymer and the metal surfaces of the extrusion equipment.

External lubricants are prevailingly waxes, conventionally falling within three classes: paraffin waxes, intermediate waxes and microcrystalline waxes. While useful, these nonetheless suffer from the fact that they are solids in the ordinary course, having high melting points, in some cases above 160° C. An example of a wax having industrial popularity as an external lubricant is hard paraffin wax, which has a melting point of 65–76° C. (ASTM D-87) and a viscosity (Saybolt Absolute Seconds, SAS) of 48–52 at 210° F. (ASTM D-1145). Because they are solid, the utilization of waxes invariably requires them to be either melted or powdered/granulated prior to admixing with the PVC resin. This increases processing costs by requiring further equipment and consumption of additional energy.

Liquid external lubricants, such as mineral oil and silicone oil, are known. However, these are less favored insofar as they have proven less effective in retarding fusion than the waxes. Mixtures of waxes with liquid external lubricants are also known, see e.g. U.S. Pat. No. 3,666,700 which employs a lubricant system of white oil and a microcrystalline wax. White oils are pharmaceutical grade mineral oils that are particularly well adapted to potable water installations insofar as they meet the requirements of USP 23 and relevant FDA regulations provided in e.g. 37 CFR 172.878 and 178.3620(a). In the practice disclosed by U.S. Pat. No. 3,666,700, the white oil has a maximum viscosity of about 3,666,700 S.U.S (Saybolt Universal Seconds) at 100° F. (about 95.4 centistokes, cSt, at 40° C.), with far lower viscosities being specifically preferred, i.e. viscosities in the range of between 50 and about 100 S.U.S. at 100° F. Indeed, the joint wax-white oil practice described in U.S. Pat. No. 3,666,700 expressly discourages against using white oils having a viscosity beyond the maximum aforesaid.

Notwithstanding these efforts, the use of waxes, even with the drawbacks hereinbefore described, is still industrially predominant, indicating an on-going need to develop external lubricants for rigid PVC pipe extrusion that offer improved processing, preferably with a reduction in costs.

SUMMARY OF THE INVENTION

In satisfaction of the foregoing desiderata, the present invention is directed to a polyvinyl chloride composition containing a high viscosity white oil, namely one having a viscosity of at least about 100 cSt at 40° C. The invention is further directed to a process for extruding said composition, and to the articles thus made, including siding, window profiles, fences, doors and, in a particular embodiment, pipe, especially pressurized pipe for potable water.

DETAILED DESCRIPTION OF THE INVENTION

Figure 1:
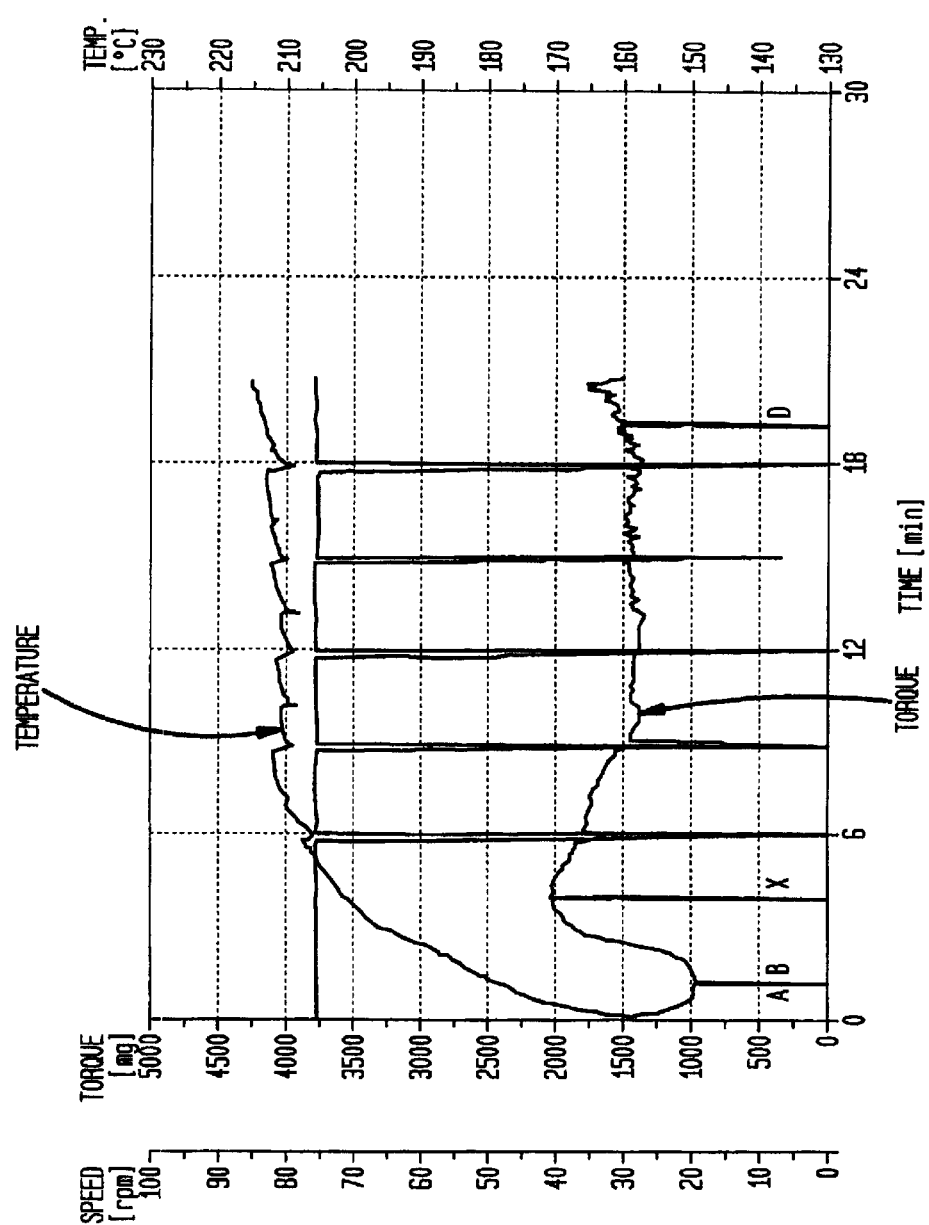
FIG. 1 is a Brabender Plastogram depicting the fusion rate of a PVC resin where the external lubricant is conventional paraffin wax.

The white oil contemplated by the invention has a viscosity of at least about 100 cSt at 40° C. (on the S.U.S. scale: at least about 525 S.U.S at 100° F.; 1 cSt at 40° C. equals 5.24 S.U.S at 100° F.). In a first embodiment, the white oil has a viscosity of about 100 cSt at 40° C. to about 1400 cSt at 40° C. (about 525 to about 7350 S.U.S. at 100° F.); in a second embodiment, the white oil has a viscosity of about 140 cSt at 40° C. to about 1000 cSt at 40° C. (about 735 to about 5250 S.U.S. at 100° F.); in a third embodiment, the white oil has a viscosity of about 200 cSt at 40° C. to about 800 cSt at 40° C. (about 1050 to about 4200 S.U.S. at 100° F.).

It is preferred that when used in potable water installations, including pipe, the white oil has a viscosity of about 100 to about 200 cSt at 40° C., especially about 110 cSt at 40° C. (about 576 S.U.S. at 100° F.), and that it further preferably has a volatility defined by the 5% point in ASTM D-2887 of 415° C., and a pour point of less than −12° C., as defined in ASTM-D97.

A white oil possessing the foregoing parameters and having particular utility and regulatory approval for potable water piping as established by the Plastics Pipe Institute (PPI) and the National Sanitary Foundation (NSF) is HYDROBRITE (TM) PVC OIL, which is a Mineral Oil USP meeting the requirements for USP 23 and FDA requirements as per 21 CFR 172.878 and 21 CFR 178.3620(a), commercially available from CK Witco, Greenwich Conn.

In a particular practice of the invention, the white oil is blended into the PVC prior to extrusion using conventional compounding and like techniques.

The amount of white oil present in the pre-extruded PVC resin can vary depending upon the end use contemplated. Generally, the amount of white oil added is between about 0.6 to about 3.0 parts (by weight) per hundred parts of resin (phr). In a preferred embodiment, the white oil is used in an amount of between about 0.8 to about 2.4 phr, more preferably between about 1.0 to about 2.2 phr; still more preferably, between about 1.0 to about 2.0 phr. When used for potable water pipe, it is preferred that the amount of white oil be present in an amount of 1.0 to 2.0 phr.

The PVC composition that results from the practice of the invention is suitable for extrusion, and exhibits improved tensile and modulus strength.

Other additives commonly employed may also be present without detriment; these include without limitation impact modifiers, pigments, fillers, stabilizers and the like. The present invention has the particular advantage that it can be practiced without the need for other external lubricants. Thus in a preferred embodiment, waxes and/or other external lubricants known in the art, such as mineral oil, are absent from the practice of the invention. In another preferred embodiment, the only external lubricant employed in the invention consists essentially of the white oil as herein described.

The extrusion techniques applicable to the present invention are those well known in the art, and include without limitation the use of single and multi-screw extruders.

The practice of the invention is particularly well-suited for products used in potable water installations. The standards for high pressure PVC pipe for potable water is established in *Technical Report TR-3/97 of the Plastics Pipe Institute Policies and Procedures for developing Hydrostatic Design Bases and Maximum Design Stresses for Thermoplastic Piping Materials* (The Society of the Plastics Industry, Washington, D.C. 1997), which Report is hereby incorporated by reference in its entirety.

Without limitation to the practice of the present invention, Report TR-3/97 promulgates an exemplary formulation for high pressure PVC potable water pipe. In salient part, this formulation is as follows:

| Class of Component | Allowable Content |
|---|---|
| PVC Resin | 100 parts |
| Stabilizer[1] | 0.3–1.0 parts |
| Calcium Stearate[2] | 0.4–1.5 parts |
| Paraffin Wax[3] | 0.6–1.5 parts |
| Polyethylene Wax[4] | 0.0–0.3 parts |
| Titanium Dioxide[5] | 0.5–3.0 parts |
| Calcium Carbonate[6] | 0.0–5.0 parts |
| Process Aid/Modifier[7] | 0.0–3.0 parts |

[1]E.g. antioxidant
[2]An internal lubricant
[3]An external lubricant
[4]An impact modifier
[5]A colorant
[6]A filler
[7]Typically a resin In one practice of the present invention, a white oil having a viscosity of at least about 100 cSt at 40° C. is substituted for the paraffin wax in the amount indicated, the formulation being as otherwise indicated. Paraffin wax as before stated is the external lubricant of current industrial choice. In a preferred practice, the paraffin wax is substituted with a white oil that has a viscosity of about 110 cSt at 40° C.

The succeeding examples are provided to illustrate the invention and are not limitative thereof.

COMPARATIVE EXAMPLE 1

Paraffin Wax

This example illustrates the rheological behavior and thermal/mechanical strength of a PVC resin that employs paraffin wax of the prior art as an external lubricant.

PVC resin (Oxy 225 from Occidental Pendulum) and paraffin wax (Sunolite 160 wax from Witco (Crompton)) in an amount of 1.2 phr were admixed together.

A Brabender Plasti-Corder was used to simulate extrusion conditions and to measure heat and shear stability of the admixture pursuant to ASTM D2538 ("Standard Practice for Fusion of PolyVinyl Chloride (PVC) Compounds Using a Torque Rheometer"). The test measured Fusion Time, Fusion Torque and Thermal Decomposition Time (also referred to as Cross-Link Time: the sum of the Fusion Time and the Thermal Stability Time); time is in minutes; torque in meter-grams (m.g.). Operating conditions were as follows:

| | |
|---|---|
| speed: | 75 rpm |
| mixer temperature: | 200° C. |
| start temperature: | 195° C. |
| measuring range: | 5000 mg |
| damping: | 3 |
| test time: | 120 min |
| sample weight: | 65 g |

The resulting plastogram is depicted at FIG. 1. FIG. 1 has denoted thereon points A, B, X and D. As ascertainable from FIG. 1:

Fusion Time=X−A, min.

Decomposition Time (Cross-Link Time)=D−A, min.

Fusion Time=Torque at X mins. (Maximum Torque)[8]

[8] In ASTM D2538, Thermal Stability is (Decomposition Time)−Fusion Time); or D−X, min.

Fusion Time, Fusion Torque and Thermal Decomposition Time are summarized at Table 1. Also included in Table 1 are measurements for Heat Deflection Temperature (HDT), and Izod Impact, as made on the resulting composition. HDT was measured in accordance with ASTM D648 ("Standard Test for Deflection Temperature of Plastics under Flexural Load Edgewise Position") using Testing Machines, Inc. (TMI) Model DTV-656–847.

Izod Impact was measured in accordance with ASTM D256 ("Standard Methods for Determining the Izod Pendulum Impact Resistance of Plastics"), Method A, using Testing Machines, Inc. (TMI) Model 43–1.

EXAMPLE 1

Hydrobrite PVC Oil

This example illustrates the Theological behavior obtained in the practice of the present invention. The procedures, equipment and composition described in Comparative Example 1 were employed, but a white oil having a viscosity of 109.7 cSt at 40° C. was used instead of the paraffin wax. The white oil was HYDROBRITE (TM) PVC OIL commercially available from CK Witco, Greenwich Conn. and was used in an amount of 1.45 phr.

Figure 2:
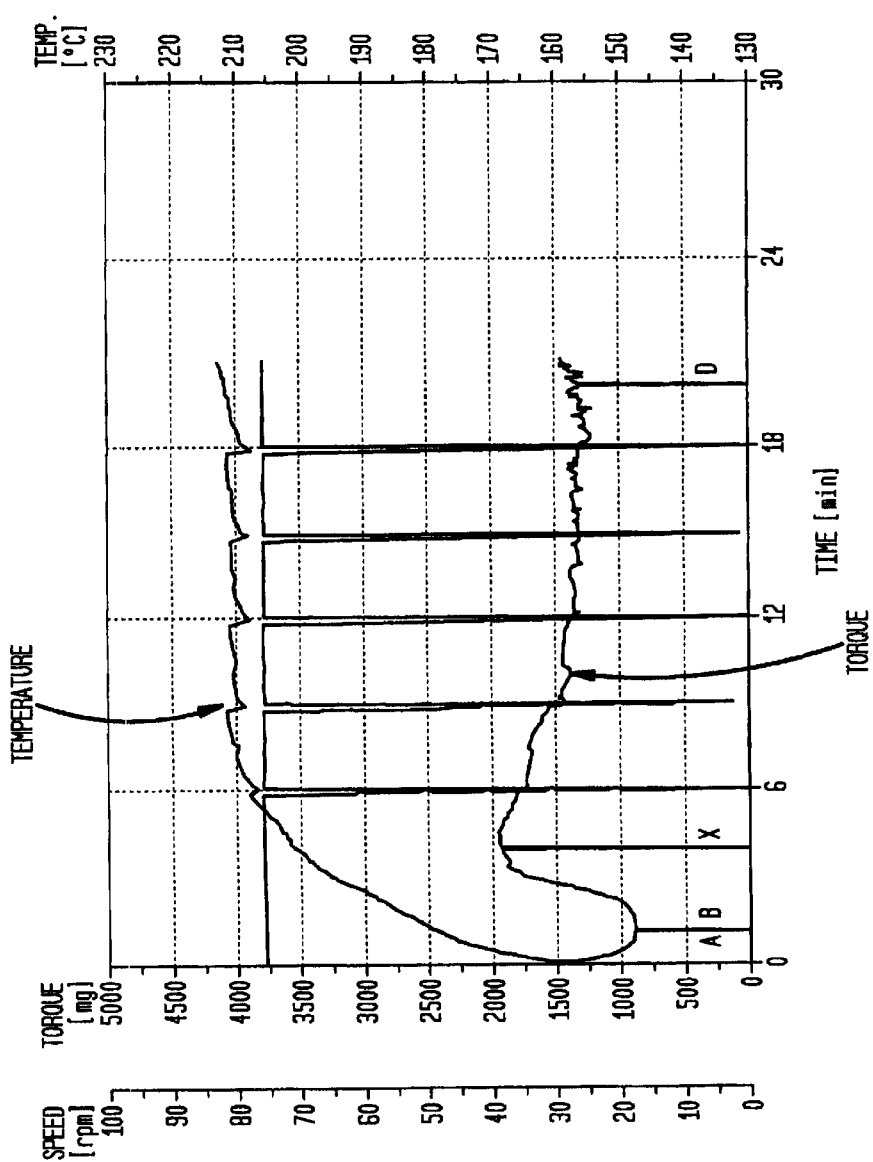
FIG. 2 is a Brabender Plastogram depicting the fusion rate of a PVC resin and a white oil in accordance with the present invention.

The resulting plastogram is depicted at FIG. 2.

Fusion Time, Fusion Torque, Thermal Decomposition Time HDT and Izod Impact are reported in Table 1.

TABLE 1

| External Lubricant | Fusion Time | Fusion Torque (m.g.) | Thermal Decomposition (min) | Heat Deflection Temperature (HDT) | IZOD Impact (ft. lbs/in) |
|---|---|---|---|---|---|
| Comp. Ex. 1 Paraffin Wax (1.2 phr) | 3.56 min | 1998 | 19.16 | 67° C. | 0.89 |
| Ex. 1 Hydrobrite PVC Oil (1.45 phr) | 4.00 min | 1894 | 20.00 | 66° C. | 0.92 |

Hydrobrite PVC Oil-Example 1

As indicated, Example 1 of the invention required less torque and a longer time to cross-link, thus evidencing easier processability.

COMPARATIVE EXAMPLE 2

Low Viscosity Mineral Oil

This example illustrates the Theological behavior and thermal/mechanical strength of a PVC resin that employs a low viscosity mineral oil as an external lubricant.

The procedures, equipment and composition described in Comparative Example 1 were employed, but a white oil having a viscosity of 29.6 cSt at 40° C. was used instead of the paraffin wax. The white oil was used in an amount of 1.5 phr.

Fusion Time, Fusion Torque, Thermal Decomposition Time were measured and appear at Table 2. Heat Deflection Temperature (HDT), Izod Impact and Tensile and Modulus Strength were also measured on the resulting composition and are reported at Table 2 (ASTM D638 "Standard Test for Stress Strain"; performed in tension using and Instron, Series IX Automated Materials Testing System. Tensile stress at break was measured in psi; Tensile Modulus is the slope of the linear position of the stress-strain curve, in psi).

EXAMPLE 2

Hydrobrite PVC Oil

This illustrates the present invention using the same protocols as set forth in Comparative Example 2, only a white oil having a viscosity of 109.7 cSt at 40° C. (HYDROBRITE (TM)) was substituted for the low viscosity mineral oil. The same rheological measurements were made and are shown in Table 2. Izod Impact, HDT and Tensile and Modulus Strength measurements are shown in Table 3.

TABLE 2

| External Lubricant | Fusion Time min | Fusion Torque (m.g.) | Thermal Decomposition (min) |
|---|---|---|---|
| Ex. 2 Hydrobrite PVC Oil (1.5 phr) | 6.32 | 2195 | 26.40 |
| Comp. Ex. 2 Low Viscosity White Oil (1.5 phr) | 2.16 | 2793 | 15.16 |

As indicated, the practice of the invention evinced markedly improved processability as measured by dramatic improvement in fusion and stability time as well as reduction in torque required.

TABLE 3

| External Lubricant | Heat Deflection Temperature | IZOD Impact (ft. lbs/in) | Tensile Strength at Break (psi) | Tensile Modulus psi |
|---|---|---|---|---|
| Ex. 2 Hydrobrite PVC Oil (1.5 phr) | 75.0° C. | 0.80 | 5861 | 206,630 |
| Comp. Ex. 2 Low Viscosity White Oil (1.5 phr) | 73.5° C. | 0.85 | 4318 | 185,270 |

As indicated, the composition of the invention represented by Example 2 showed dramatically improved tensile and modulus strength than when conventional low viscosity mineral oil used employed as an external lubricant. The low viscosity white oil was more compatible with PVC than the Hydrobrite PVC Oil and appeared to be plasticizing the PVC resin, as shown by the reduced tensile strength and modulus.

What is claimed is:

1. A polyvinyl chloride composition which comprises:
   (a) 100 parts of a polyvinyl chloride (PVC) resin; and
   (b) between about 0.6 part and about 3.0 parts of a white oil having a viscosity of at least about 100 cSt at 40° C., said parts being by weight.

2. The composition of claim 1 wherein said white oil has a viscosity of about 100 cSt to about 1400 cSt at 40° C.

3. The composition of claim 2 wherein said white oil has a viscosity of about 140 cSt to about 1000 cSt at 40° C.

4. The composition of claim 3 wherein said white oil has a viscosity of about 200 cSt to about 800 cSt at 40° C.

5. The composition of claim 1 wherein said white oil is present in an amount of about 0.8 part and about 2.4 parts.

6. The composition of claim 5 wherein said white oil is present in an amount of about 1.0 part and about 2.2 parts.

7. The composition of claim 6 wherein said white oil is present in an amount of about 1.0 part and about 2.0 parts.

8. The composition of claim 7 wherein said polyvinyl chloride resin is suitable for making PVC pipe for potable water.

9. The composition of claim 7 wherein said white oil has a viscosity of about 110 cSt at 40° C.

10. The composition of claim 9 further comprising one or more of the following:
- 0.3–1.0 part stabilizer;
- 0.4–1.5 parts internal lubricants;
- 0.0–0.3 part impact modifier;
- 0.5–3.0 parts colorant;
- 0.0–5.0 parts filler; and
- 0.0–3.0 parts process aid/modifier.

11. The composition of claim 10 wherein said stabilizer is an antioxidant; said internal lubricant is calcium stearate; said impact modifier is polyethylene wax; said colorant is titanium dioxide; said filler is calcium carbonate; and said process aid/modifier is a resin.

12. A process for extruding polyvinyl chloride (PVC) which comprises:
   (a) admixing a PVC resin suitable for extrusion with between about 0.6 phr to about 3.0 phr of said PVC resin of a white oil having a viscosity of about 100 cSt at 40° or higher; and
   (b) extruding the mixture of step (a).

13. The process of claim 12 wherein said white oil has a viscosity of about 100 cSt to about 1400 cSt at 40° C.

14. The process of claim 13 wherein said white oil has a viscosity of about 140 cSt to about 1000 cSt at 40° C.

15. The process of claim 14 wherein said white oil has a viscosity of about 200 to about 800 cSt at 40° C.

16. The process of claim 12 wherein said white oil is admixed in an amount of about 0.8 to about 2.4 phr of said PVC resin.

17. The process of claim 16 wherein said white oil is admixed in an amount of about 1.0 to 2.2 phr of said PVC resin.

18. The process of claim 17 wherein said white oil is admixed in an amount of about 1.0 to about 2.0 phr of said PVC resin.

19. An extruded PVC product made by the process of claim 12.

20. The extruded PVC product of claim 19 wherein said product is a siding, window profile, fence, door or pipe.

21. The extruded PVC product made by the process of claim 18 wherein said product is pipe for potable water.

22. A potable water pipe comprised of a PVC resin and a white oil having a viscosity of about 100 to about 200 cSt at 40° C., said white oil is present in an amount of about 1.0 to about 2.0 phr of said PVC resin.

23. The potable water pipe of claim 22 wherein said white oil has a viscosity of about 110 cSt at 40° C.

24. The potable water pipe of claim 23 further comprising one or more of the following: a stabilizer, an internal lubricant, an impact modifier, a colorant, a filler, a process aid/modifier.

25. A rigid PVC potable water pipe comprised of:
- 100 parts PVC resin;
- 1.0–2.0 parts of a white oil having a viscosity of about 110 cSt at 40° C.;
- 0.3–1.0 parts stabilizer;
- 0.4–1.5 parts calcium stearate;
- 0.0–0.3 parts polyethylene wax;
- 0.5–3.0 titanium dioxide;
- 0.0–5.0 parts calcium carbonate; and
- 0.0–3.0 parts process aid/modifier.

* * * * *

UNITED STATES PATENT AND TRADEMARK OFFICE
CERTIFICATE OF CORRECTION

PATENT NO. : 6,663,931 B2
DATED : December 16, 2003
INVENTOR(S) : Cohen

It is certified that error appears in the above-identified patent and that said Letters Patent is hereby corrected as shown below:

Title page,
Item [73], Assignee, please delete "Crompton Corporation & Petro-Canada, Middlebury (CA)" and insert -- Crompton Corporation, Middlebury CT and Petro-Canada, Calgary, Alberta, Canada -- in its place.

Column 5,
Lines 17 and 51, please delete "Theological" and insert -- rheological -- in its place.

Signed and Sealed this

Twenty-third Day of March, 2004

JON W. DUDAS
*Acting Director of the United States Patent and Trademark Office*